3,459,860
2-AMINOMETHYL-2,3-DIHYDROBENZOFURANS AS ANTIHYPERTENSIVE AGENTS
Charles Ferdinand Huebner, Chatham, and Lincoln Harvey Werner, Summit, N.J., assignors to Ciba Corporation, New York, N.Y., a corporation of Delaware
No Drawing. Continuation of application Ser. No. 640,845, May 24, 1967, which is a continuation-in-part of application Ser. No. 580,880, Sept. 21, 1966. This application June 9, 1967, Ser. No. 644,793
Int. Cl. A61k 27/00; C07d 99/04
U.S. Cl. 424—250          2 Claims

ABSTRACT OF THE DISCLOSURE 2-(4-arylpiperazino)-methyl-2,3-dihydrobenzofurans of the formula

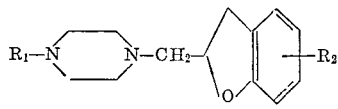

$R_1$=iso- or heterocyclic aryl
$R_2$=H, alkyl, alkoxy, alkylmercapto, halogen, $CF_3$ or alkanoyl
quaternaries and salts thereof exhibit hypotensive effects.

CROSS-REFERENCES TO RELATED APPLICATIONS

This is a continuation of application Ser. No. 640,845 filed May 24, 1967, which in turn is a continuation-in-part of application Ser. No. 580,880, filed Sept. 21, 1966, both of which are now abandoned.

SUMMARY OF THE INVENTION

The present invention concerns and has for its object the provision of new 2-(4-arylpiperazino)-methyl-2,3-dihydrobenzofurans, more particularly those of the Formula I

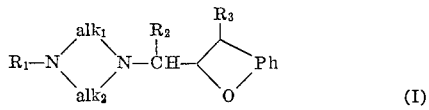

in which $R_1$ stands for an iso- or heterocyclic aryl radical, each of $alk_1$ and $alk_2$ for lower alkylene separating the nitrogen atoms by 2 carbon atoms, each of $R_2$ and $R_3$ for hydrogen or lower alkyl, and Ph for a 1,2-phenylene radical, quaternaries and salts thereof, corresponding pharmaceutical compositions and methods for the preparation of these products. Said compositions are useful as antihypertensives, for example, in the management and treatment of essential hypertension, vasospastic conditions and toxemia of pregnancy.

DESCRIPTION OF THE PREFERRED EMBODIMENTS

The aromatic radical $R_1$ in Formula I is preferably a monocyclic iso- or heterocyclic aryl radical, containing up to 2 heteroatoms, preferably nitrogen, oxygen and/or sulfur atoms, such as phenyl, pyridyl, furyl, thienyl, pyridazyl, pyrimidyl, pyrazinyl, oxazinyl or thiazinyl. These radicals are unsubstituted or substituted by one or more than one of the same or of different substituents attached to any of the positions available for substitution. Such substituents are, for example, lower alkyl, e.g. methyl, ethyl, n- or i-propyl or -butyl, etherified hydroxy or mercapto, such as lower alkoxy, alkylenedioxy or alkylmercapto, e.g. methoxy, ethoxy, n- or i-propoxy or -butoxy, methylenedioxy, methyl- or ethylmercapto, esterified hydroxy, such as halogeno, e.g. fluoro, chloro or bromo, trifluoromethyl, nitro or amino, particularly di-lower alkylamino, e.g. dimethylamino or diethylamino, or acyl, preferably lower alkanoyl, e.g. acetyl, propionyl or butyryl. Preferred aryl radicals $R_1$ are phenyl, (lower alkyl)-phenyl, (lower alkoxy)-phenyl, di-(lower alkoxy)-phenyl, (lower alkylenedioxy)-phenyl, (lower alkylmercapto)-phenyl, (halogeno)-phenyl, (trifluoromethyl)-phenyl, (nitro)-phenyl, (di-lower alkylamino)-phenyl, (lower alkanoyl)-phenyl, pyridyl, (lower alkyl)-pyridyl, furyl, (lower alkyl)-furyl, thienyl, (lower alkyl)-thienyl, pyridazyl, (lower alkyl)-pyridazyl, pyrimidyl, (lower alkyl)-pyrimidyl, pyrazinyl, (lower alkyl)-pyrazinyl, oxazinyl, (lower alkyl)-oxazinyl, thiazinyl or (lower alkyl)-thiazinyl.

The lower alkylene radicals $alk_1$ and $alk_2$, preferably stand for 1,2-ethylene, but also for 1,2-propylene, 1,2- or 2,3-butylene, 1,2- or 2,3-pentylene or 3,4-hexylene.

The radicals $R_2$ and $R_3$ represent preferably hydrogen, but also lower alkyl, e.g. that mentioned above.

The 1,2-phenylene radical is unsubstituted or substituted as shown for the aryl radical $R_1$. It preferably corresponds to those unsubstituted or substituted phenyl radicals shown as the preferred embodiments of $R_1$.

Quaternaries are preferably lower alkyl- or aralkyl-quaternaries, e.g. the methyl-, ethyl-, propyl-, benzyl-, 1- or 2-phenylethyl-quaternaries.

The compounds of this invention exhibit valuable pharmacological properties. Apart from adrenergic blocking effects, they show primarily hypotensive activity, as can be demonstrated in animal tests using, for example mammals, such as dogs, as test objects. Besides their above-mentioned use, the compounds of the invention are also valuable intermediates in the manufacture of other useful compounds, particularly pharmacologically active products.

Particularly useful are compounds of the Formula I in which $R_1$ stands for phenyl, (lower alkyl)-phenyl, (lower alkoxy)-phenyl, di-(lower alkoxy)-phenyl, (lower alkylmercapto)-phenyl, (halogeno)-phenyl, (trifluoromethyl)-phenyl, (lower alkanoyl)-phenyl, pyridyl or (lower alkyl)-pyridyl, each of $alk_1$ and $alk_2$ for 1,2-ethylene, each of $R_2$ and $R_3$ for hydrogen or methyl, and Ph for 1,2-phenylene, (lower alkyl)-1,2-phenylene, (lower alkoxy)-1,2-phenylene, (lower alkylmercapto)-1,2-phenylene, (halogeno)-1,2-phenylene, (trifluoromethyl)-1,2-phenylene or (lower alkanoyl)-1,2-phenylene, and therapeutically useful acid addition salts thereof.

Especially valuable are compounds of the Formula II

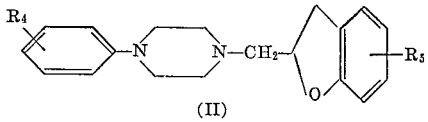

in which each of $R_4$ and $R_5$ stands for hydrogen, methyl, methoxy, chloro or acetyl, and therapeutically useful acid addition salts thereof which, when applied orally or into a loop of the small intestine of normal or renal hypertensive dogs in a dosage range of about 0.1 mg./kg. to 15 mg./kg./day, preferably of about 0.3 to 5 mg./kg./day show outstanding hypotensive effects.

The compounds of this invention are prepared according to known methods. For example, the process for their preparation consists in:

(a) Reacting a reactive ester of a 2-hydroxymethyl-2,3-dihydrobenzofuran or phenol, with the corresponding piperazine, more particularly those of the formulae

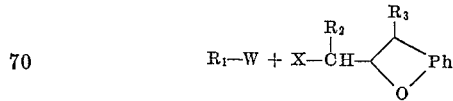

in which one of W and X stands for a reactively esterified group and the other for

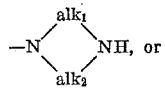

(b) Reacting a 2 - Y-methyl-2,3-dihydro-benzofuran with a Z-substituted aromatic compound, more particularly those of the formulae

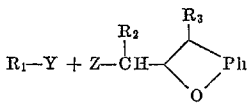

in which one of Y and Z stands for primary amino, and the other for reactively esterified bis-($\beta$-hydroxy-lower alkyl)-amino, or (c) Reacting a 2-($\beta$-arylamino-lower alkylaminomethyl)-2,3-dihydrobenzofuran with a reactively esterified $\alpha,\beta$-lower alkylene glycol, more particularly those of the formulae

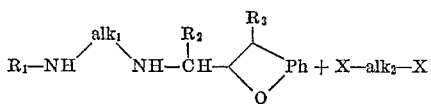

or (d) Reducing a 1-aryl-4-(2,3-dihydro-2-benzofuroyl)-piperazine more particularly that of the formula

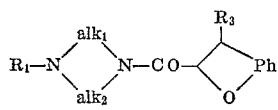

or (e) Hydrogenating a 2 - (4-arylpiperazino)-methyl-benzofuran, more particularly that of the formula

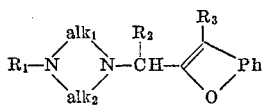

and, if desired, converting a resulting compound into another disclosed compound.

A reactive ester of the above-mentioned alcohols is, for example, that of a mineral or sulfonic acid, preferably that of a hydrohalic acid, e.g. hydrochloric or hydrobromic acid, sulfuric, methane-, ethane-, benzene- or p-toluenesulfonic acid. A reactive ester of the above phenols, is advantageously that of hydrofluoric or hydrochloric acid.

The above-mentioned reactions are carried out according to standard methods, in the presence or absence of diluents, preferably such as are inert to the reagents and are solvents thereof, of catalysts, condensing or reducing agents respectively and/or inert atmospheres, at low temperatures, room temperature or elevated temperatures, at atmospheric or superatmospheric pressure. Condensing agents are especially used in the reaction with said reactive esters in order to eliminate the acid formed. They are basic agents, for example, alkali or alkaline earth metal carbonates or lower alkoxides, or organic nitrogen bases, such as pyridine or collidine, advantageously aliphatic tertiary amines, such as tri-lower alkylamines, e.g. triethylamine. The reduction according to item (d) is preferably carried out with the use of complex light metal hydrides, such as alkali metal aluminum or borohydrides, e.g. lithium aluminm hydride, or by electrolytic reduction. The hydrogenation according to item (e) is advantageously carried out in the presence of platinum or nickel catalysts. Resulting compounds may be converted into each other according to known methods. For example, any nitro group present may be reduced to the amino group or a nitro or acyl group may be introduced by nitration or according to the Friedel-Crafts reaction respectively. A primary amino group present, may be converted into another group accessible by the Sandmeyer replacement reactions, or substituted with the use of reactive esters of alcohols. By the latter method tertiary amines obtained may be quaternized, for example, with the use of lower alkyl or aralkyl halides, e.g. chlorides, bromides or iodides.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric, or perchloric acid; aliphatic or aromatic carboxylic or sulfonic acids e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines mentioned under items (a) to (c) can be used in the form of their alkali metal, e.g. sodium or potassium salts. Mainly, those starting materials should be used in the process of the invention that lead to the formation of those compounds indicated above as being specially valuable.

The starting material used is known or, if new, may be prepared according to known methods. For example, that used in reaction (a) is prepared by condensing a reactive ester of a 2-($\beta,\gamma$-dihydroxy-lower alkyl)-phenol in the presence of an alkali metal alkoxide or by reaction of an N-unsubstituted piperazine with a reactive ester of a 2-hydroxymethyl-2,3-dihydro-benzofuran. That used in reaction (b) advantageously analogous to method (a), that used in reaction (c) analogous to method (b), e.g., by reacting an N-($\beta$-haloalkyl)-aniline with a primary 2-aminomethyl-2,3-dihydrobenzofuran. The starting material mentioned under item (d) is prepared, for example, by reacting a 2,3-dihydro-2-benzofuroyl halide with a 1-aryl-piperazine and that mentioned under item (e) analogously to method (a).

The compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g., lactose, glucose or sucrose, starches, e.g., corn starch or arrowroot, stearic acid or salts thereof, e.g., magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient.

The following examples are intended to illustrate the invention and are not to be construed as being limitations thereon. Temperatures are given in degrees centigrade, and all parts wherever given are parts by weight.

EXAMPLE 1

The mixture of 5.0 g. 2-bromomethyl-5-methoxy-2,3-dihydrobenzofuran, 4.05 g. 1-(2-chlorophenyl)-piperazine, 3.0 g. anhydrous sodium carbonate and 20 ml. isoproponol is refluxed for 24 hours while stirring. After cooling, the mixture is filtered, the filtrate evaporated in vacuo, the residue dissolved in diethyl ether, the solution washed with water and extracted with 5% hydrochloric acid. The aqueous solution is chilled, the precipitate formed filtered off and recrystallized from ethanol to yield the 1-(2-chloro-phenyl)-4-(5-methoxy - 2,3 - dihydro - 2 - benzofuryl)-methyl-piperazine hydrochloride of the formula

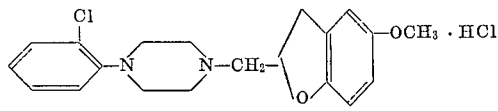

melting at 220–223°.

EXAMPLE 2

In the manner described in Example 1, the compounds listed below are prepared from equivalent amounts of the corresponding starting materials. In case the resulting product does not crystallize from the aqueous extract, it is isolated as follows: The acidic aqueous solution is made basic with sodium hydroxide, extracted with diethyl ether, the extract dried, filtered and evaporated. The residue, if necessary, is recrystallized as indicated to yield the free base. It is dissolved in ethanol, the solution acidified with ethanolic hydrochloric acid and the hydrochlorides so-obtained recrystallized, if necessary, from ethanol:

(a) 1-phenyl-4-(5-methoxy - 2,3 - dihydro - 2 - benzofuryl)-methyl-piperazine, M.P. 115–117° (from isoproponol) its dihydrochloride melts at 234–235°, (b) 1-(2-methyl-phenyl)-4-(5-methoxy - 2,3 - dihydro-2-benzofuryl) - methyl - piperazine, its dihydrochloride melts at 228–230°, (c) 1-(2-methoxy-phenyl) - 4 - (5 - methoxy-2,3-dihydro-2-benzofuryl)-methyl-piperazine, M.P. 81–85°, its dihydrochloride melts at 210–212°, (d) 1-(4-methoxy-phenyl) - 4 - (5 - methoxy-2,3-dihydro-2-benzofuryl)-methyl-piperazine, M.P. 90–94°, its dihydrochloride melts at 220–225°, (e) 1-(2,6-dimethoxy-phenyl) - 4 - (5 - methoxy-2,3-dihydro-2-benzofuryl)-methyl-piperazine, its dihydrochloride melts at 195–200°, (f) 1-(4-chloro-phenyl) - 4 - (5 - methoxy-2,3-dihydro-2-benzofuryl-methyl-piperazine, M.P. 100–104°, its dihydrochloride melts at 220–225°, (g) 1-(2-chloro-phenyl) - 4 - (5 - methyl-2,3-dihydro-2-benzofuryl)-methyl-piperazine, its hydrochloride melts at 215–219°.

EXAMPLE 3

The mixture of 5.1 g. 2-bromomethyl-5-acetyl-2,3-dihydrobenzofuran, 5.9 g. 1-phenyl-piperazine and 30 ml. ethanol is heated in a sealed tube at 150° for 4 hours. It is filtered, the filtrate evaporated, the residue dissolved in the minimal amount of ethyl acetate, the solution acidified with hydrogen chloride in ethyl acetate and the precipitate formed recrystallized from isoproponol to yield the 1-phenyl-4-(5-acetyl-2,3-dihydro-2-benzofuryl)-methyl-piperazine hydrochloride of the formula

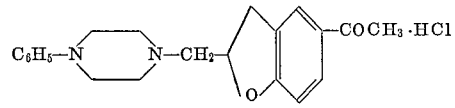

melting at 204–205°.

The starting material is prepared as follows: the mixture of 95.2 g. 4-hydroxy-acetophenone, 84.7 g. allyl bromide, 98.0 potassium carbonate and 150 ml. acetone is refluxed for 8 hours while stirring and allowed to stand overnight at room temperature. It is diluted with 1 liter water, extracted 3 times with 350 ml. diethyl ether, dried, filtered, evaporated, the residue distilled and the fraction boiling at 112–118°/0.7 mm. Hg. collected; it represents the 4-allyloxy-acetophenone.

109 g. thereof are heated to 230–235° for 1½ hours under nitrogen. Hereupon 153 ml. acetic acid anhydride are added, the mixture refluxed for 3 hours, evaporated, the residue distilled and the fraction boiling at 123–125°/0.5 mm. Hg. collected; it represents the 3-allyl-4-acetoxy-acetophenone.

To the mixture of 103 g. thereof and 350 ml. carbon disulfide, 75.1 g. bromine are added at —5 to 0° during 2 hours. The mixture is evaporated in vacuo, the residue dissolved in 500 ml. diethyl ether and the solution allowed to stand for 2½ days in the refrigerator, to yield the 3-(2,3-dibromopropyl)-4-acetoxy-acetophenone, which is used without further purification.

To the solution of 179 g. thereof in 500 ml. ethanol, the solution prepared from 11.0 g. sodium and 475 ml. ethanol is added dropwise while stirring. The mixture is refluxed for 1 hour, then cooled, filtered, and the filtrate evaporated. The residue is taken up in 1 liter water, the solution extracted with diethyl ether, the extract dried, filtered, evaporated and the fraction boiling at 170°/0.05 mm. Hg. collected; it represents the 2-bromo-methyl-5-acetyl-2,3-dihydrobenzofuran.

In the analogous manner, the 2-bromomethyl-7-acetyl-2,3-dihydrobenzofuran, boiling at 147–150°/0.05 mm. Hg is obtained from 2-hydroxy-acetophenone.

EXAMPLE 4

The mixture of 5.1 g. 2-bromomethyl-7-acetyl-2,3-dihydrobenzofuran, 5.9 g. 1-phenyl-piperazine and 30 ml. ethanol is heated in a sealed tube to 150° for 4 hours. It is evaporated, the residue taken up in 200 ml. diethyl ether, the mixture filtered, the filtrate washed with water, dried, filtered and evaporated. The residue is dissolved in the minimal amount ethyl acetate, the solution acidified with hydrogen chloride in ethyl acetate and the precipitate formed recrystallized from ethanol to yield the 1-phenyl-4-(7-acetyl-2,3-dihydro-2-benzofuryl)-methyl - piperazine of the formula

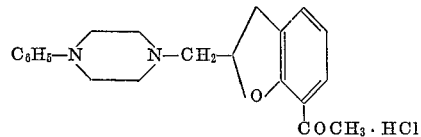

melting at 212–213°.

In the analogous manner, the following compounds are prepared from equivalent amounts of the corresponding starting materials:

(a) 1-(2-methyl - phenyl)-4-(7 - acetyl-2,3-dihydro-2-benzofuryl)-methyl-piperazine hydrochloride melting at 242–244°, (b) 1-(3-methyl - phenyl)-4-(7 - acetyl-2,3-dihydro-2-benzofuryl)-methyl-piperazine hydrochloride melting at 189–190°, (c) 1-(2-chloro - phenyl)-4-(7 - acetyl-2,3-dihydro-2- benzofuryl)-methyl-piperazine hydrochloride melting at 199–200°.

EXAMPLE 5

The mixture of 1.9 g. 2-aminomethyl-5-acetyl-2,3-dihydrobenzofuran, 2.0 g. N,N-bis-(2-chloroethyl)-aniline, 4.0 g. potassium carbonate and 50 ml. ethanol is refluxed overnight while stirring. It is filtered hot, the residue washed with ethanol and the filtrate evaporated in vacuo. The residue is taken up in ethyl acetate, the solution acidified with hydrogen chloride in ethyl acetate and the precipitate formed recrystallized from isopropanol to yield the 1-phenyl-4-(5-acetyl - 2,3 - dihydro-2-benzofuryl)-methyl-piperazine hydrochloride melting at 203–204°; it is identical with the product obtained according to Example 3.

The starting material is prepared as follows: The mixture of 2.55 g. 2-bromomethyl-5-acetyl-2,3-dihydrobenzofuran, 1.86 g. potassium phthalimide, one crystal potassium iodide and 10 ml. dimethylformamide is refluxed for 10 hours. It is poured onto ice, the mixture extracted with chloroform and the extract washed with aqueous potassium hydroxide, 0.5 N hydrochloric acid and water, dried and evaporated. The residue is taken up in a solution of 2 ml. hydrazine hydrate in 20 ml. methanol and the mixture refluxed for 3 hours. It is cooled, acidified with concentrated hydrochloric acid, again refluxed for 30 minutes and filtered. The filtrate is evaporated under reduced pressure, the residue taken up in water, the solution made basic with aqueous potassium hydroxide and extracted with diethyl ether. The extract is dried, filtered and evaporated to yield the 2-aminomethyl-5-acetyl-2,3-dihydrobenzofuran, which is used without further purification.

EXAMPLE 6

The mixture of 3.1 g. N-phenyl-N'-(7-acetyl-2,3-dihydro-2-benzofuryl)-methyl-ethylenediamine, 1.88 g. ethylene dibromide, 4.0 g. potassium carbonate, 10 ml. n-butanol and a drop of water is refluxed overnight while stirring. It is filtered hot, the residue washed with ethanol and the filtrate evaporated. The residue is taken up in ethyl acetate, the solution acidified with hydrogen chloride in ethyl acetate and the precipitate formed recrystallized from ethanol to yield the 1-phenyl-4-(7-acetyl-2,3-dihydro-2-benzofuryl)-methyl-piperazine melting at 210–212°; it is identical with the product obtained according to Example 4.

The starting material is prepared as follows: The mixture of 1.36 g. N-phenyl-ethylenediamine, 2.55 g. 2-bromomethyl-7-acetyl-2,3-dihydro-benzofuran and 15 ml. ethanol is kept in a sealed tube at the water bath for 10 hours. It is evaporated, the residue made basic with aqueous potassium hydroxide and extracted with benzene. The extract is dried and evaporated to yield the N-phenyl-N'-(7-acetyl-2,3-dihydro-2-benzofuryl) - methyl-ethylenediamine, which is used without further purification.

EXAMPLE 7

The solution of 16.2 g. 1-phenyl-4-(5-methoxy-2,3-dihydro-2-benzofuroyl)-piperazine in 100 ml. tetrahydrofuran is added dropwise to the mixture of 2.5 g. lithium aluminum hydride and 500 ml. tetrahydrofuran while stirring. The mixture is then refluxed overnight and after cooling 2.5 ml. water, 2 ml. 20% aqueous sodium hydroxide and 9 ml. water are added in this order. It is filtered, the filtrate evaporated and the residue recrystallized from isopropanol to yield the 1-phenyl-4-(5-methoxy-2,3-dihydro-2-benzofuryl)-methyl-piperazine melting at 115–117°; it is identical with the product obtained according to Example 2a).

EXAMPLE 8

The mixture of 6.17 g. 2-bromomethyl-7-methoxy-2,3-dihydro-benzofuran, 5.0 g. 1-(2-chloro-phenyl)-piperazine, 2.68 g. sodium carbonate and 30 ml. isopropanol is refluxed for 24 hours. After cooling, it is filtered, the residue washed with water, dried and recrystallized from ethanol to yield the 1-(2-chlorophenyl)-4-(7-methoxy-2,3-dihydro-2-benzofuryl)-methyl-piperazine of the formula

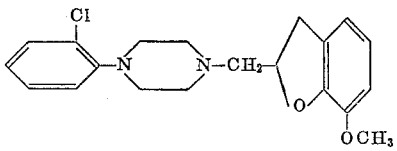

melting at 96–100°.

Its hydrochloride is obtained from a saturated ethanolic solution, acidified with ethanolic hydrochloric acid; it melts at 248–250°.

EXAMPLE 9

The mixture of 5.0 g. 2-bromomethyl-7-methoxy-2,3-dihydrobenzofuran, 4.0 g. 1-(2-methoxy-phenyl)-piperazine, 2.8 g. sodium carbonate and 30 ml. isopropanol is refluxed for 24 hours. It is cooled, filtered, and the residue washed with water. The filtrate is evaporated, the residue taken up in diethyl ether, the extract washed once with water and extracted with 5% aqueous hydrochloric acid. The aqueous solution is made basic with ammonia and extracted with diethyl ether. The extract is washed with water, dried, filtered and evaporated. The residue is acidified with ethanolic hydrochloric acid, the crystalline material filtered off and recrystallized from ethanol-diethyl ether, to yield the 1-(2-methoxy-phenyl)-4 - (7 - methoxy - 2,3 - dihydro - 2 - benzofuryl) - methylpiperazine dihydrochloride of the formula

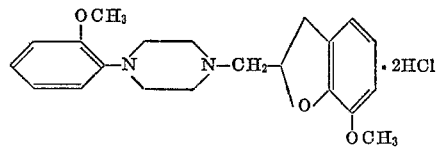

melting at 200–203°.

In the analogous manner the following compounds are prepared from equivalent amounts of the corresponding starting materials.

(a) 1 - (3 - methoxy - phenyl) - 4 - (5 - methoxy - 2,3-dihydro - 2 - benzofuryl) - methyl - piperazine hydrochloride, M.P. 211–214° (from ethanol), (b) 1 - (3 - chloro - phenyl) - 4 - (5 - methoxy - 2,3-dihydro - 2 - benzofuryl) - methyl - piperazine dihydrochloride, M.P. 213–214° (from ethanol) and (c) 1 - (2,5 - dimethoxy - phenyl) - 4 - (5 - methoxy-2,3 - dihydro - 2 - benzofuryl) - methyl - piperazine hydrochloride, M.P. 182–190° (from ethanol-diethyl ether).

EXAMPLE 10

Preparation of 10,000 tablets each containing 50 mg. of the active ingredient:

| Formula: | G. |
|---|---|
| 1 - (2 - chloro - phenyl) - 4 - (5 - methoxy-2,3 - dihydro - 2 - benzofuryl) - methyl-piperazine hydrochloride | 500.0 |
| Lactose | 1,706.0 |
| Corn starch | 90.0 |
| Polyethylene glycol 6,000 | 90.0 |
| Talcum powder | 90.0 |
| Magnesium stearate | 24.0 |
| Purified water, q.s. | |

Procedure

All the powders are passed through a screen with an opening of 0.6 mm. Then the drum substance, lactose, talcum, magnesium stearate and half of the starch are mixed in a suitable mixer. The other half of the starch is suspended in 50 ml. water and the suspension added to the boiling solution of the polyethylene glycol in 50 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

EXAMPLE 11

Preparation of 160,000 tablets each containing 0.025 g. of the active ingredient.

Ingredients:  G.
1 - (2 - methoxy - phenyl) - 4 - (5 - methoxy - 2,3 - dihydro - 2 - benzofuryl)-methyl-piperazine dihydrochloride _____ 4,000.0
Lactose _____ 28,289.0
Corn starch _____ 3,410.0
Confectioners sugar _____ 2,800.0
Colloidal silica _____ 1,000.0
Stearic acid powder _____ 400.0
Calcium stearate _____ 100.0
Purified water, q.s.

Procedure

The active ingredient, the lactose, 2,500.0 g. of the corn starch, the confectioners sugar and the colloidal silica are passed through a screen with 1 mm. openings into a mixer and blended at low speed for twenty minutes. The remainder of the corn starch is suspended in 1 liter cold water, and a paste is formed by gradually adding 4 liters of boiling water. The mixed powders are granulated with the above paste, using additional water as required. The resulting moist mass is passed through a screen with 4 mm. openings placed on trays and dried at 38° C. until the moisture content is between 2 and 3%. The granules are broken in a comminuting machine, knives forward, passed through a screen with 1 mm. openings and treated with the stearic acid and the calcium stearate, both screened through a screen with 0.8 mm. openings. After mixing for twenty minutes, the granulation is compressed into tablets using standard concave punches, uppers doubly scored.

EXAMPLE 12

The mixture of 5.0 g. 2-bromomethyl-5-methoxy-2,3-dihydrobenzofuran, 3.35 g. of 1-(2-pyridyl)-piperazine, 3.0 g. sodium carbonate and 35 ml. isopropanol is refluxed for 24 hours. It is cooled, filtered, and the residue washed with water. The filtrate is evaporated, the residue taken up in diethyl ether, the extract washed once with water and extracted with 5% aqueous hydrochloric acid. The aqueous solution is made basic with ammonia and extracted with diethyl ether. The extract is washed with water, dried, filtered and evaporated. The residue is recrystallized from diethyl ether to yield the 1 - (2 - pyridyl) - 4 - (5 - methoxy - 2,3 - dihydro - 2-benzofuryl)-methyl-piperazine of the formula

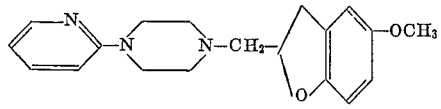

melting at 98–100°. Its dihydrochloride monohydrate melts at 260–263° with decomposition, after recrystallization from ethanol-diethyl ether.

What is claimed is:
1. An antihypertensive phermaceutical composition comprising a hypotensively effective amount of a compound having the formula

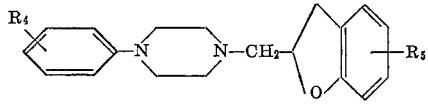

in which each of $R_4$ and $R_5$ stands for hydrogen, methyl, methoxy, chloro or acetyl, or a therapeutically useful acid addition salt thereof, together with an orally applicable pharmaceutical excipient.

2. A composition as claimed in claim 1, wherein the hypotensive compound is the 1-(2-methoxy-phenyl)-4-(5-methoxy - 2,3 - dihydro - 2 - benzofuryl) - methyl - piperazine or a therapeutically useful acid addition salt thereof.

References Cited

UNITED STATES PATENTS

| | | | |
|---|---|---|---|
| 2,633,468 | 3/1953 | Pohland | 260—294.7 |
| 3,070,606 | 12/1962 | Anderson | 260—294.7 |
| 3,200,132 | 8/1965 | Harvey | 260—346.2 |

ALBERT T. MEYERS, Primary Examiner

J. D. GOLDBERG, Assistant Examiner

U.S. Cl. X.R.

260—268